United States Patent

Morita et al.

[11] Patent Number: 5,861,551
[45] Date of Patent: Jan. 19, 1999

[54] COMBUSTION STATE DETECTING APPARATUS FOR AN INTERNAL-COMBUSTION ENGINE

[75] Inventors: Shingo Morita; Wataru Fukui, both of Tokyo, Japan

[73] Assignee: Mitsubishi Denki Kabushiki Kaisha, Tokyo, Japan

[21] Appl. No.: 886,467

[22] Filed: Jul. 1, 1997

[30] Foreign Application Priority Data

Feb. 7, 1997 [JP] Japan ................................ 9-025482

[51] Int. Cl.⁶ .................................................. G01M 15/00
[52] U.S. Cl. ........................... 73/116; 123/481; 324/399; 324/402
[58] Field of Search ............................ 73/116, 117.2, 73/117.3, 118.1; 123/481; 324/399, 402

[56] References Cited

U.S. PATENT DOCUMENTS

| 3,938,490 | 2/1976 | Snyder et al. | 123/611 |
| 5,054,460 | 10/1991 | Ogita | 123/571 |
| 5,146,893 | 9/1992 | Ohsawa | 123/425 |
| 5,343,844 | 9/1994 | Fukui et al. | 123/481 |
| 5,392,641 | 2/1995 | McCombie | 73/117.3 |
| 5,425,339 | 6/1995 | Fukui | 123/416 |
| 5,460,129 | 10/1995 | Miller et al. | 123/90.15 |
| 5,602,332 | 2/1997 | Pyko | 73/117.3 |

*Primary Examiner*—George Dombroske
*Attorney, Agent, or Firm*—Sughrue, Mion, Zinn, Macpeak & Seas,PLLC

[57] ABSTRACT

An combustion state detecting apparatus for an internal-combustion engine is equipped with: an ignition coil (4) for applying a high voltage (V2) for igniting to the spark plugs (8a through 8d) of the cylinders of an internal-combustion engine; an ionic current detecting circuit for applying a bias voltage (VBi) to at least one spark plug to detect ionic currents (ia, ib) flowing via the spark plug which has just been subjected to ignition control; comparator circuits (14a, 14b) which compare detected ionic current signals (Eia, Eib) with threshold values (TH1, TH2) and turn them into ionic current pulses (Gia, Gib); and an ECU (2A) which drives the ignition coil according to a crank angle signal (SGT) and determines the combustion state of the internal-combustion engine. The ECU changes the threshold values for each ignition control and judges the combustion state according to the respective threshold values and the state in which the ionic current pulses are generated.

9 Claims, 8 Drawing Sheets

FIG. 7

COMBUSTION STATE DETECTING APPARATUS FOR AN INTERNAL-COMBUSTION ENGINE

BACKGROUND OF THE INVENTION

1. Field of the Invention

The present invention relates to a combustion state detecting apparatus for detecting a combustion state according to the ionic current detected from a spark plug immediately after the ignition of an internal-combustion engine and, more particularly, to a combustion state detecting apparatus for an internal-combustion engine, which apparatus changing the threshold value for shaping ionic current waveform for each ignition control and carries out statistical processing on a plurality of ionic current pulses obtained for each threshold value, thereby enabling various combustion states to be detected with high reliability.

2. Description of Related Art

In general, in an internal-combustion engine, a fuel-air mixture composed of fuel and air which has been introduced into a combustion chamber is compressed as a piston moves up, and high voltage for ignition is applied to a spark plug installed in the combustion chamber to generate an electric spark so as to burn the fuel-air mixture; the force pushing the piston down which is produced during the power stroke is taken out as a rotary output.

When the combustion takes place in the combustion chamber, the particles in the combustion chamber are ionized; therefore, applying high voltage to an ionic current detecting electrode installed in the combustion chamber causes ions with electric charges to move, thus producing a flow of ionic current.

The ionic current sensitively reacts to the combustion state in the combustion chamber, making it possible to detect a combustion state such as a misfire according to a detected ionic current value, i.e. the amount of generated ions.

The apparatus which detects a failure of normal combustion, i.e. a misfire, from the amount of ionic current detected immediately following ignition is well known (refer, for example, to the one disclosed in Japanese Unexamined Patent Publication No. 2-104978. It is also well known that, in such an apparatus, a spark plug also serves as an ionic current detecting electrode.

Figure 7:
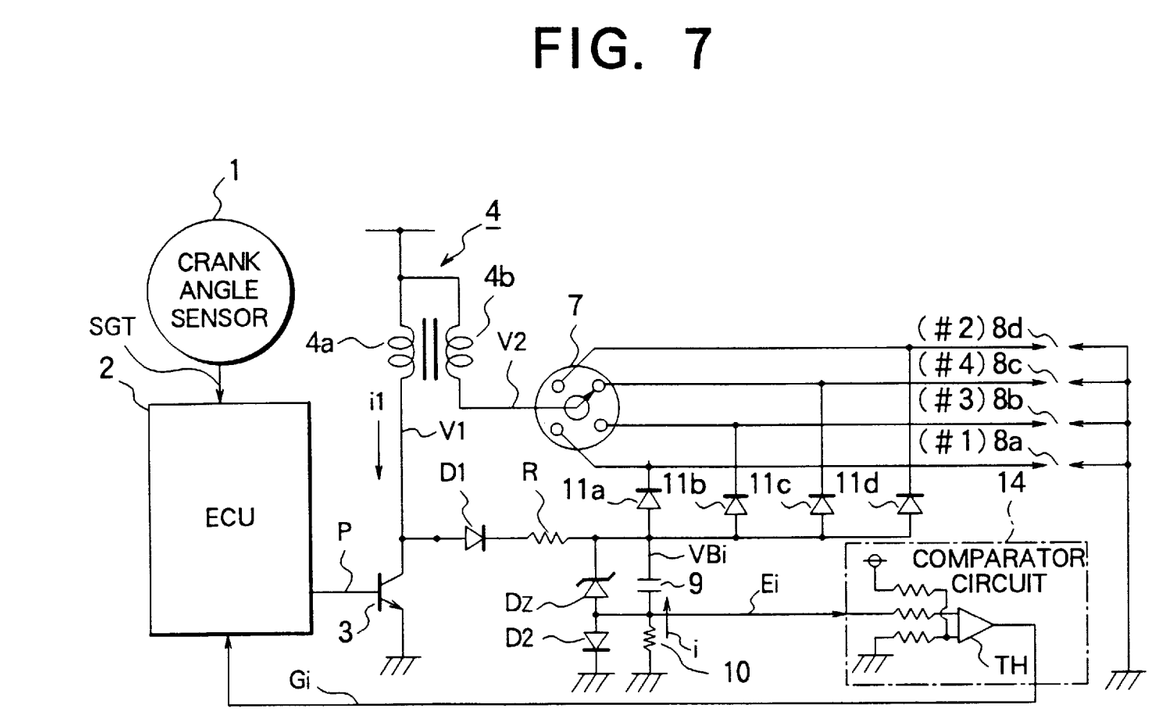
FIG. 7 is a block diagram illustrating a conventional combustion state detecting apparatus for an internal combustion engine.

FIG. 7 is a block diagram illustrative of a conventional combustion state detecting apparatus for an internal-combustion engine, the apparatus employing ionic current; it shows a case wherein high voltage is distributed to the spark plugs of respective cylinders through a distributor.

Figure 8:
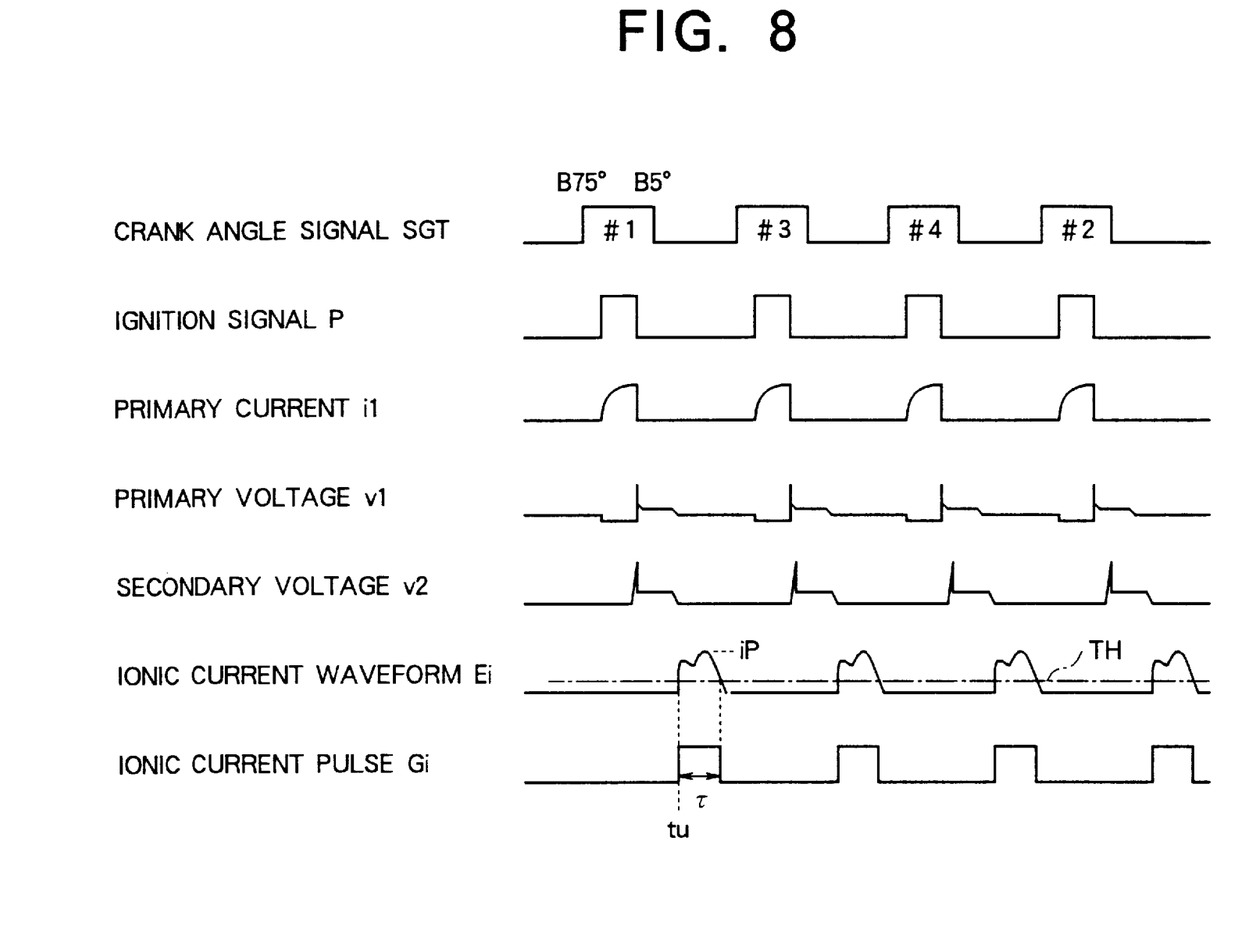
FIG. 8 shows timing charts illustrating the operation of the conventional combustion state detecting apparatus for an internal-combustion engine in the case of normal combustion.

FIG. 8 shows a timing chart illustrative of the operating waveforms of each signal in FIG. 7; it shows the waveforms observed when normal combustion takes place.

In FIG. 7, a crankshaft of an internal-combustion engine, i.e. an engine, which is not shown, is provided with a crank angle sensor 1. The crank angle sensor 1 issues a crank angle signal SGT composed of pulses based on the engine speed.

Each pulse edge of the crank angle signal SGT indicates the reference crank angle of each cylinder (#1 through #4) of the internal-combustion engine; the crank angle signal SGT is supplied to an ECU 2 comprised of a microcomputer and used for various control operations.

Typically, the rising edge of the crank angle signal SGT is set at the crank angle position of B75 degrees (75 degrees before the upper dead center) which corresponds to the timing at which initial energization is begun; the falling edge is set at the crank angle position of B5 degrees (5 degrees before the upper dead center) which corresponds to the timing of initial ignition.

Although it is not shown, the ECU 2 receives cylinder identifying signals generated in synchronization with engine speed in addition to the operational information from a variety of sensors. In the ECU 2, the cylinder identifying signals contribute, in association with the crank angle signal SGT, to the identification of the respective cylinders to be controlled.

The ECU 2 performs diverse control operations based on the crank angle signal SGT from the crank angle sensor 1, the cylinder identifying signals, and the operational information from the sensors, then issues driving signals for diverse actuators including an ignition coil 4.

For instance, a driving signal P for the ignition coil 4 is applied to the base of a power transistor 3 connected to a primary winding 4a of the ignition coil 4 in order to turn ON/OFF the power transistor 3, thereby turning ON/OFF the supply of primary current i1. Cutting primary current i1 off causes primary voltage V1 to rise, and secondary winding 4b of the ignition coil 4 generates further boosted secondary voltage V2 as the high voltage of a few tens of kilovolts for ignition.

A distributor 7 connected to the output terminal of a secondary winding 4b sequentially distributes and applies the secondary voltage V2 to spark plugs 8a through 8d of the respective cylinders #1 through #4 in synchronization with the revolution of the internal-combustion engine so as to burn the fuel-air mixture by generating discharge sparks in the combustion chambers of cylinders under ignition control.

A series circuit constituted by a rectifying diode D1 connected to one end of the primary winding 4a, a resistor R for limiting current, a capacitor 9 connected in parallel to a zener diode DZ for limiting voltage, and a rectifying diode D2 is connected to the ground from one end of the primary winding 4a to constitute a path for supplying charging current to a bias supply (to be discussed later) for detecting ionic current.

The capacitor 9 is charged to a predetermined bias voltage VBi of several hundreds of volts to function as a bias supply for detecting ionic current i; it supplies ionic current i by discharging via a spark plug which has just been subjected to ignition control, i.e. during the latter half period of a power stroke, among the spark plugs 8a through 8d.

A detecting resistor 10 in the path of ionic current i extending from one end of the capacitor 9 to the ground constitutes an ionic current detecting circuit for producing an ionic current detecting signal, i.e. an ionic current waveform Ei.

High-voltage diodes 11a through 11d which have the anodes thereof connected to the other end of the capacitor 9 and which are connected to the path of the ionic current i have the cathodes thereof connected to one end of the respective spark plugs 8a through 8d so that the polarities thereof are identical to ignition polarities.

The ionic current detecting signal, i.e. the ionic current waveform Ei, is compared with a predetermined threshold value TH in a comparator circuit 14 and turned into an ionic current pulse Gi which is supplied into the ECU 2 as a detected ionic current value for determining a combustion state (misfire).

Threshold value TH which provides the comparative reference for forming pulses is set to a fixed value by a line voltage which has been divided.

In FIG. 8, the ignition signal P is generated in the controlling sequence of cylinder #1, cylinder #3, cylinder #4, and cylinder #2. The primary current i1 of each cylinder is supplied to produce the secondary voltage V2. The ionic current waveform Ei is generated immediately after the cutoff timing of the ignition signal P, i.e. the ignition timing; it indicates a peak value ip and then falls.

The ionic current pulse Gi rises at time tu when the ionic current waveform Ei exceeds the threshold value TH and switches to ON for a section of a pulse width τ.

Referring to FIG. 8, the operation of the conventional combustion state detecting apparatus for an internal-combustion engine shown in FIG. 7 will now be described.

Normally, the ECU 2 issues a fuel injection signal for an injector, not shown, and the ignition signal P for the power transistor 3 in accordance with the crank angle signal SGT, etc., and it turns ON/OFF the power transistor 3 by the ignition signal P to turn ON/OFF the supply the primary current i1.

When the primary current i1 is cut off, the primary winding 4a generates the boosted primary voltage V1. This causes charging current to flow via the path composed of the rectifying diode D1, the resistor R, the capacitor 9, and the rectifying diode D2, thus charging the capacitor 9. The charging of the capacitor 9 is terminated when the charging voltage of the capacitor 9 has become equal to the reverse breakdown voltage, i.e. bias voltage VBi, of the zener diode DZ.

When the primary voltage V1 is generated at the primary winding 4a, the secondary winding 4b in the ignition coil 4 generates the further secondary voltage V2 of a few tens of kilovolts which has been boosted to high voltage for ignition and applies it to the spark plugs 8a through 8d of the respective cylinders in the order of #1, #3, #4, and #2 in which they are listed via the distributor 7. This causes spark discharge to take place at the spark plugs of the cylinders to be subjected to ignition control, thereby burning fuel-air mixture to provide a torque from the power stroke.

The combustion of the fuel-air mixture generates ions in the combustion chamber of the cylinder, and the bias voltage VBi charged in the capacitor 9 causes the ionic current i to flow; e.g., when the fuel-air mixture is burned in the spark plug 8a, the ionic current i flows through the capacitor 9, the rectifying diode 11a, the spark plug 8a, the detecting resistor 10, and the capacitor 9 in the order in which they are listed.

The ionic current i is converted to voltage via the detecting resistor 10 and formed into the ionic current waveform Ei; it is further formed into the ionic current pulse Gi via the comparator circuit 14 before being supplied to the ECU 2.

The ECU 2 then determines whether the combustion state of the cylinder under ignition control is good, that is, whether a misfire has happened, mainly according to the presence of the ionic current pulse Gi and according as whether the rising timing tu and the pulse width τ of the ionic current pulse Gi satisfy judgment conditions.

In the case of normal combustion, the fuel-air mixture is burned only at the spark plug of the cylinder which is in the compression stroke among the spark plugs 8a to 8d of the respective cylinders. The cylinders are subjected to the ignition control in the order of cylinder #1, cylinder #3, cylinder #4, and cylinder #2 as previously mentioned.

In a four-stroke engine, the control cycle of each cylinder is repeated in the order of the induction stroke, the compression stroke, the power stroke, and the exhaust stroke, thus shifting from one stroke to another.

Thus, the ECU 2 detects the ionic current pulse Gi of a series corresponding to the respective spark plugs 8a to 8d while identifying fuel injection and the cylinders under ignition control, thereby determining the combustion state such as the presence of a misfire in each cylinder.

The pulse width τ of the ionic current pulse Gi, however, depends on the fixed threshold value TH since the threshold value TH in the comparator circuit 14 is set to a fixed value.

Hence, when determining the combustion state of an internal-combustion engine according to the pulse width τ of the ionic current pulse Gi obtained using the fixed threshold value TH, it is difficult to accurately identify the varying factors of the ionic current i indicative of the combustion state of the internal-combustion engine, the varying factors including the peak value ip, the generating period, i.e. the pulse width τ, and the disturbance in waveform. This has also posed a problem in that it is difficult to accurately recognize the combustion state of the internal-combustion engine.

SUMMARY OF THE INVENTION

The present invention has been made with a view toward solving the problems described above, and it is an object of the invention to provide a combustion state detecting apparatus for an internal-combustion engine, which apparatus changing the threshold value for each ignition control and carries out statistical processing on a plurality of ionic current pulses obtained for each threshold value, thereby enabling various combustion states to be detected with high reliability.

A combustion state detecting apparatus for an internal-combustion engine according to the present invention is equipped with: a crank angle sensor which issues, in synchronization with the revolution of the internal-combustion engine, a crank angle signal having a pulse edge which corresponds to a reference crank angle position; a plurality of cylinders which are subjected to ignition control in order in synchronization with the revolution of the internal-combustion engine; an ignition coil for applying high voltage for ignition to the spark plugs of the respective cylinders; an ionic current detecting circuit which detects the ionic current flowing via a spark plug, which has just been subjected to the ignition control, by applying bias voltage to at least one spark plug; a comparator circuit which compares a detected ionic current signal with a threshold value and shapes it into a waveform of an ionic current pulse; and an ECU which drives the ignition coil according to the crank angle signal and determines the combustion state of the internal-combustion engine according to the ionic current pulse; the ECU changing the threshold value for each ignition control and determining the combustion state according to each threshold value and the state in which the ionic current pulse is generated.

The ionic current detecting circuit of the combustion state detecting apparatus for an internal-combustion engine according to the present invention includes a first ionic current detecting circuit for detecting each ionic current corresponding to a first cylinder group among a plurality of cylinders, and a second ionic current detecting circuit for detecting each ionic current corresponding to a second cylinder group among a plurality of cylinders. The comparator circuit includes a first comparator circuit connected to the first ionic current detecting circuit and a second comparator circuit connected to the second ionic current detecting circuit. The ECU changes the threshold values separately for the first comparator circuit and the second comparator circuit.

The ECU of the combustion state detecting apparatus for an internal-combustion engine in accordance with the present invention determines the combustion state according to the threshold values and the presence of an ionic current pulse.

Further, the ECU of the combustion state detecting apparatus for an internal-combustion engine in accordance with the present invention increases the threshold value by a predetermined value from a minimum value for each ignition control and detects the threshold value, at which ionic current pulses are no longer generated, as the peak value of ionic current in order to judge the combustion state according to the peak value.

Furthermore, the ECU of the combustion state detecting apparatus for an internal-combustion engine in accordance with the present invention decreases the threshold value by a predetermined value from a maximum value for each ignition control and detects the threshold value, at which ionic current pulses begin to be generated, as the peak value of ionic current in order to judge the combustion state according to the peak value.

Moreover, the ECU of the combustion state detecting apparatus for an internal-combustion engine in accordance with the present invention judges the combustion state according to the threshold values and the pulse width of an ionic current pulse.

The ECU of the combustion state detecting apparatus for an internal-combustion engine in accordance with the present invention detects the pulse width, which is obtained when the threshold value is set to the minimum value, as the generating period of ionic current, and determines the combustion state according to the generating period of ionic current.

The ECU of the combustion state detecting apparatus for an internal-combustion engine in accordance with the present invention detects the peak value of ionic current according to threshold values and the presence of an ionic current pulse and it also detects the generating period of ionic current according to the threshold values and the pulse width of the ionic current pulse so as to determine the combustion state according to the peak value and the generating period.

The ECU of the combustion state detecting apparatus for an internal-combustion engine in accordance with the present invention determines the combustion state according to the threshold values and the number of ionic current pulses.

DESCRIPTION OF THE PREFERRED EMBODIMENTS

First Embodiment

Figure 1:
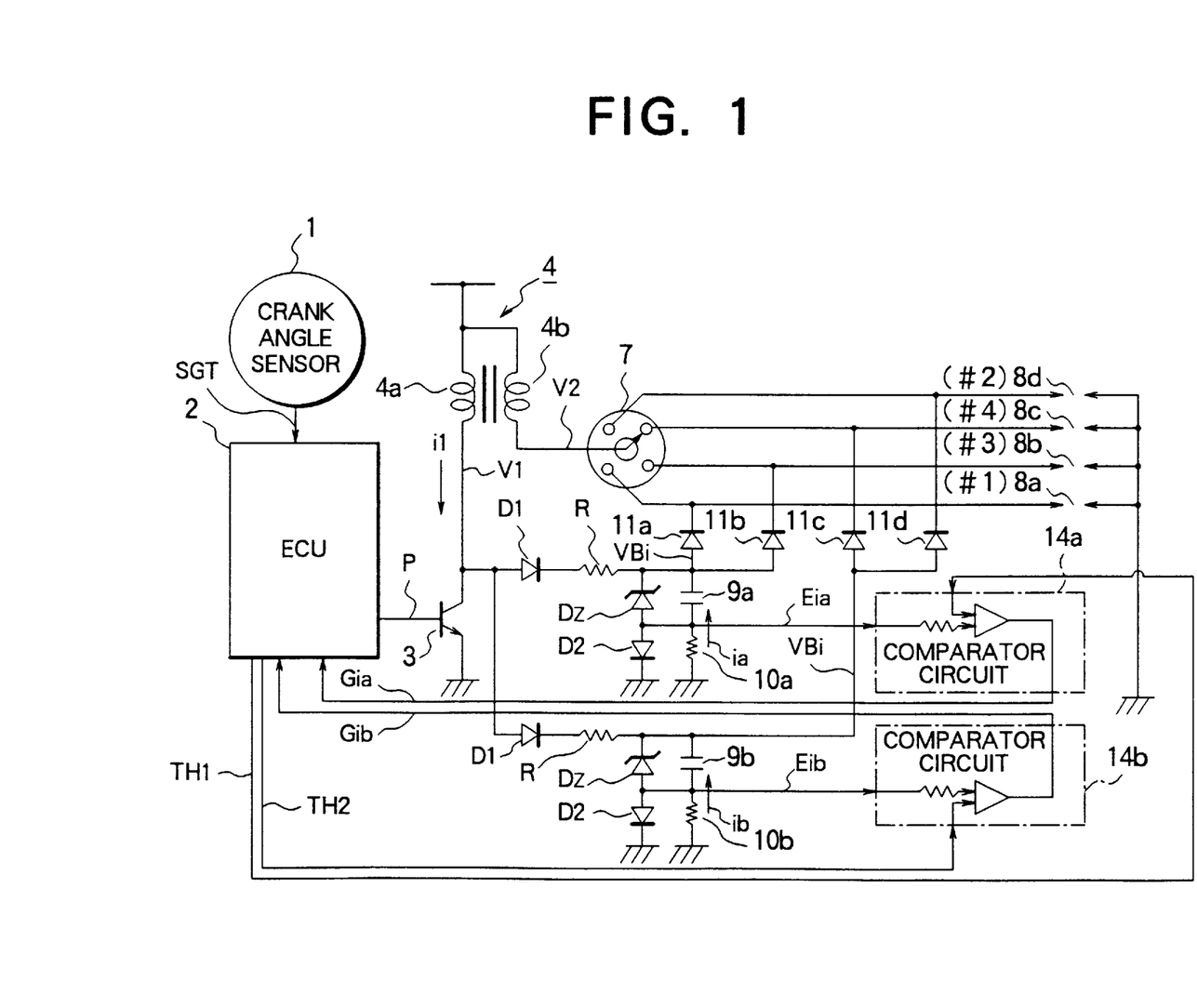
FIG. 1 is a block diagram showing first through sixth embodiments according to the present invention.

A first embodiment of the present invention will be described with reference to the accompanying drawings. FIG. 1 is a block diagram illustrating the first embodiment of the invention; like components as those described above will be assigned like reference numerals and the detailed description thereof will be omitted.

In this embodiment, two systems of the same configuration including the ionic current detecting circuit and comparator circuits 14a and 14b are provided. An example will be given wherein a first ionic current pulse Gia associated with cylinder #1 and cylinder #4 which belong to the first cylinder group wherein the ignition control sequence is discontinuous, and a second ionic current pulse Gib associated with cylinder #3 and cylinder #2 which belong to the second cylinder group wherein the ignition control sequence is discontinuous are individually output.

An ECU 2A individually generates threshold values TH1 and TH2, which provide the comparative references in the respective comparator circuits 14a and 14b, while changing them for each ignition control.

A first ionic current detecting circuit includes a series circuit composed of a capacitor 9a and a detecting resistor 10a. Connected to one end of the detecting resistor 10a is the first comparator circuit 14a.

A second ionic current detecting circuit includes a series circuit composed of a capacitor 9b and a detecting resistor 10b. Connected to one end of the detecting resistor 10b is the comparator circuit 14b.

Spark plugs 8a and 8c of cylinder #1 and cylinder #4 are connected to the capacitor 9a in one ionic current detecting circuit via high-voltage diodes 11a and 11c; they are subjected to a bias voltage VBi applied by the capacitor 9a.

Spark plugs 8b and 8d of cylinder #3 and cylinder #2 are connected to the capacitor 9b in the other ionic current detecting circuit via high-voltage diodes 11b and 11d; they are subjected to a bias voltage VBi applied by the capacitor 9b.

Hence, an ionic current ia associated with cylinder #1 and cylinder #4 which belong to the first cylinder group is detected in the form of an ionic current waveform Eia via the detecting resistor 10a in one ionic current detecting circuit and it is formed into an ionic current pulse Gia via the comparator circuit 14a before it supplied to the ECU 2A.

Likewise, an ionic current ib associated with cylinder #3 and cylinder #2 which belong to the second cylinder group is detected in the form of an ionic current waveform Eib by the detecting resistor 10b in the other ionic current detecting circuit and it is formed into an ionic current pulse Gib via the comparator circuit 14b before it supplied to the ECU 2A.

In the configuration described above, the ionic currents relative to the cylinders in successive ignition control order are detected via the two different systems alternately and they present the ionic current waveforms Eia and Eib, and ionic current pulses Gia and Gib, respectively.

Figure 2:
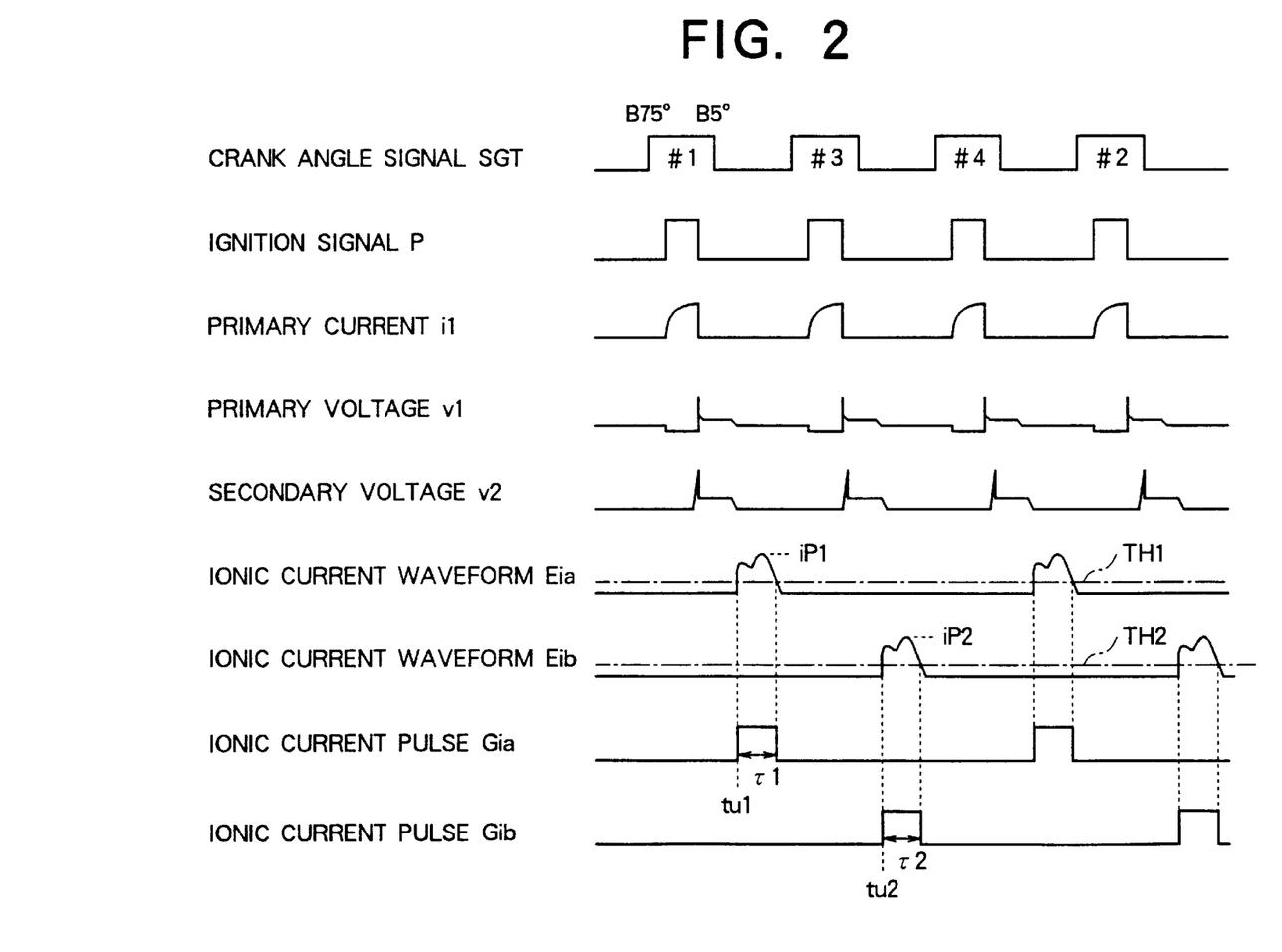
FIG. 2 shows timing charts illustrating the operations of the first through fifth embodiments according to the present invention.
Figure 3:
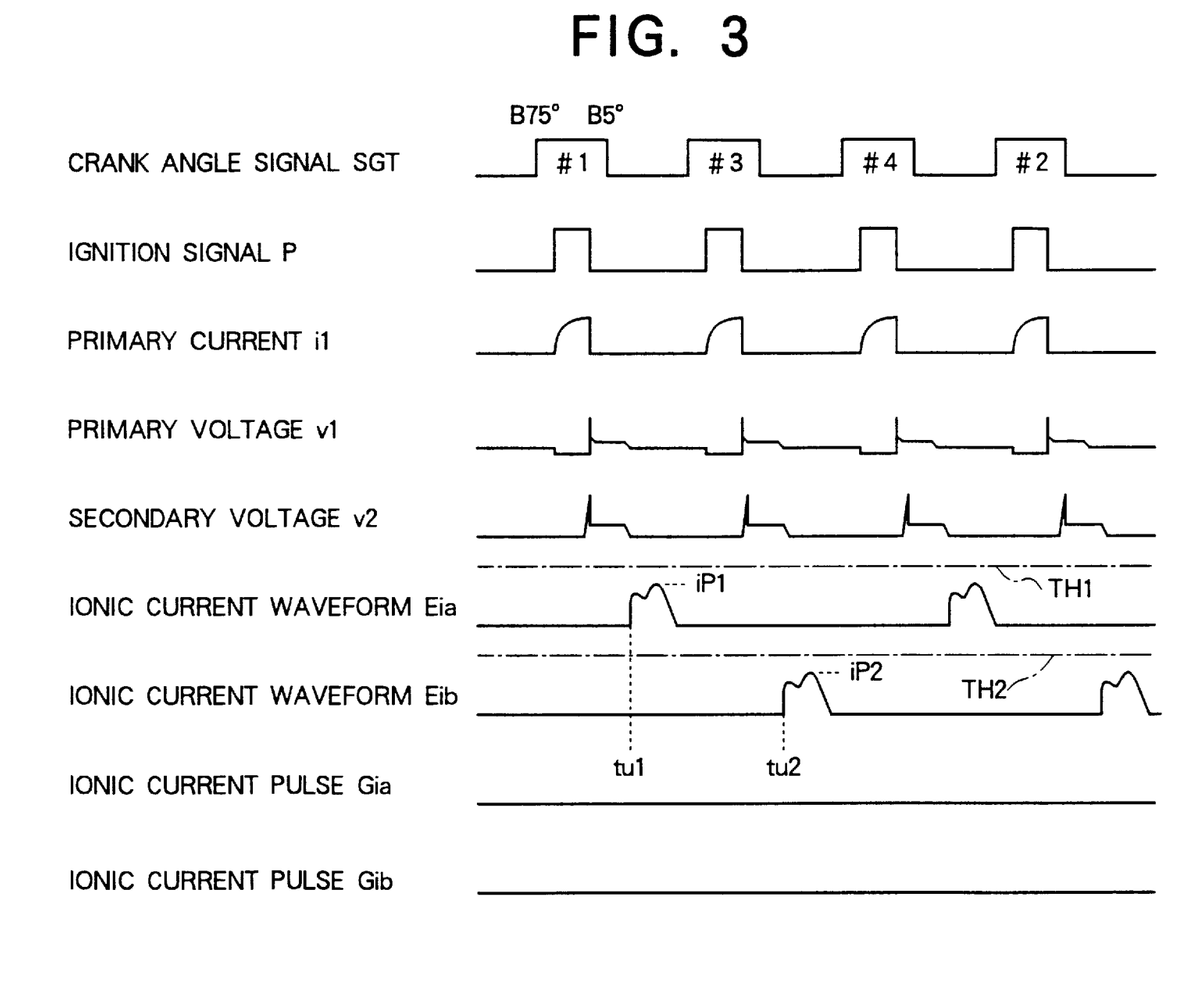
FIG. 3 shows timing charts illustrating the operations of the first through fifth embodiments according to the present invention.
Figure 4:
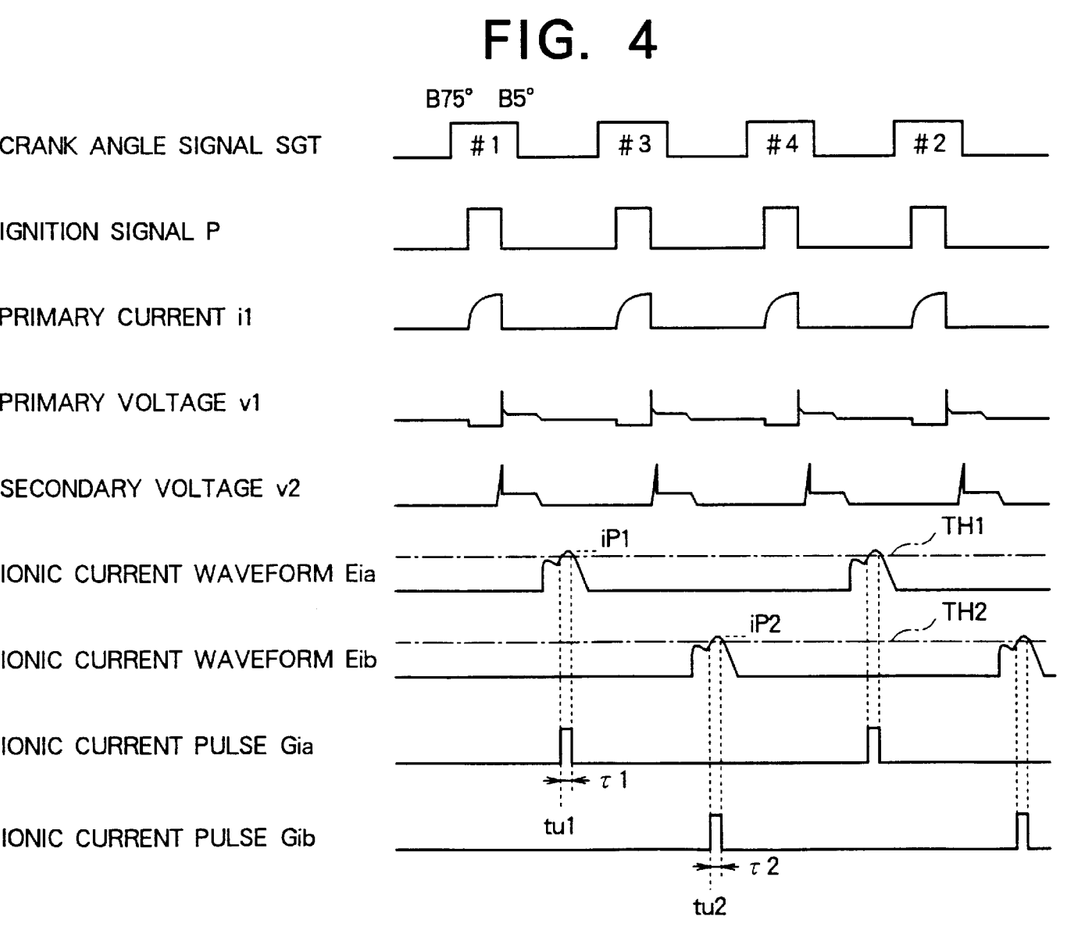
FIG. 4 shows timing charts illustrating the operations of the first through fifth embodiments according to the present invention.

FIG. 2 through FIG. 4 show timing charts illustrative of the signal waveforms in FIG. 1 which are observed in the case of normal combustion. The threshold values TH1 and TH2 are set to different values in these drawings; FIG. 2 uses a minimum value, FIG. 3 uses a maximum value, and FIG. 4 shows a case where they are set to values slightly lower than peak values ip1 and ip2 of the ionic current waveforms Eia and Eib.

Figure 5:
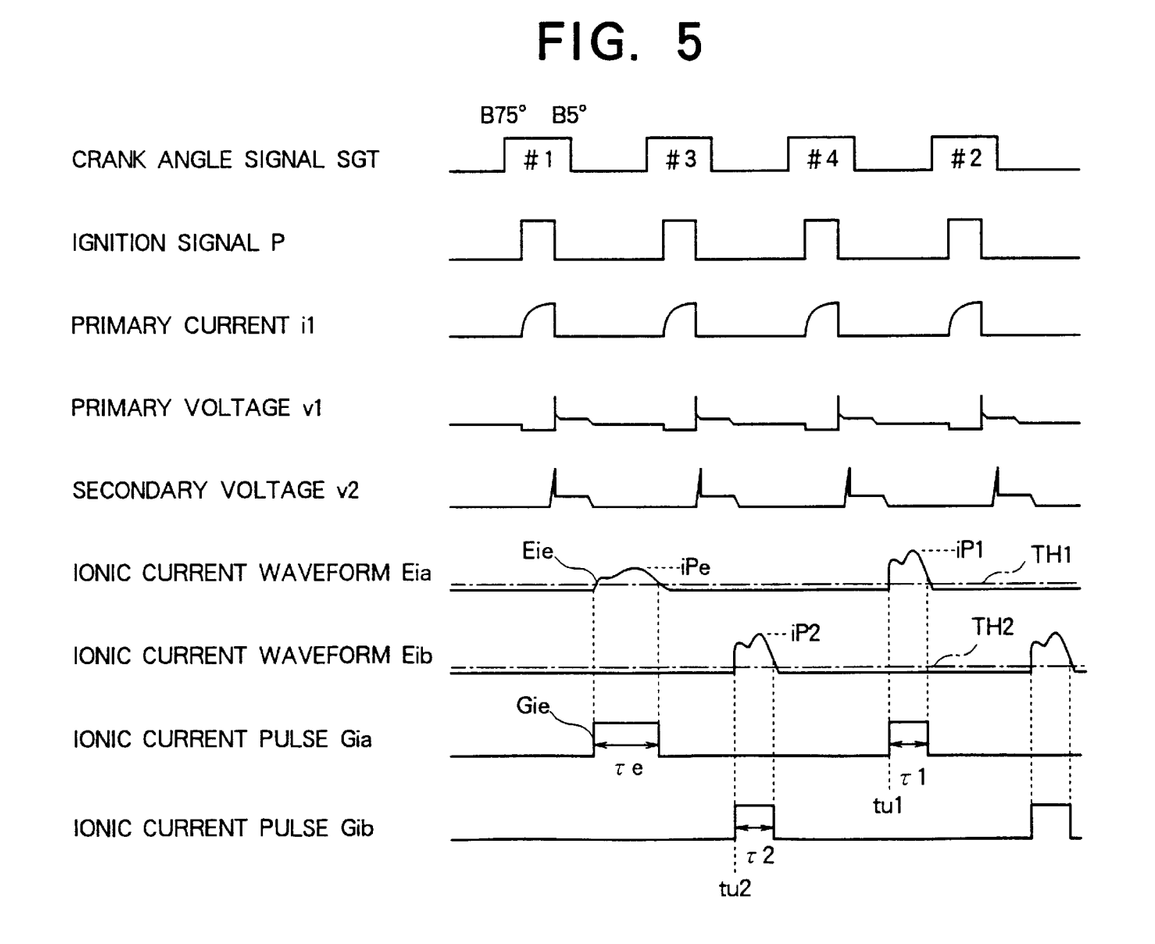
FIG. 5 shows timing charts illustrating the operations of the first through fifth embodiments according to the present invention when a combustion failure has occurred.

FIG. 5 shows timing charts illustrative of signal waveforms in FIG. 1 which are observed when a combustion failure has taken place in cylinder #1; it shows a case where the threshold values TH1 and TH2 are set to the minimum value.

In FIG. 2 through FIG. 5, the ionic current waveforms Eia and Eib have peak values ip1 and ip2, respectively. The ionic current pulses Gia and Gib rise at times tu1 and tu2, respectively, and they have pulse widths τ1 and τ2, respectively.

In FIG. 5, the ionic current waveform Eie observed in the case of a combustion failure exhibits a peak value ipe which is lower than a normal peak value; an ionic current pulse Gie in this case has a pulse width τe which is greater than a normal pulse width.

Referring now to FIG. 2 through FIG. 5, the operation of the first embodiment in accordance with the first embodiment shown in FIG. 1 will be described.

Firstly, in FIG. 1, one ionic current detecting circuit and the comparator circuit 14a generate the first ionic current pulse Gia for each ignition control of the spark plugs 8a and 8c of cylinder #1 and cylinder #4. Likewise, the other ionic current detecting circuit and the comparator circuit 14b generate the second ionic current pulse Gib for each ignition control of the spark plugs 8b and 8d of cylinder #3 which is ignited after cylinder #1, and cylinder #2 which is ignited after cylinder #4.

At this time, the relationship between cylinder #1 and cylinder #4 and the relationship between cylinder #3 and cylinder #2 are symmetrical to each other in stroke; for example, when one is in the compression stroke, the other is in the exhaust stroke. Accordingly, there should be no case where the ionic current pulse Gia or Gib is generated in succession by one ionic current detecting circuit. As a result, the detecting resistors 10a and 10b alternately output the ionic current waveforms Eia and Eib based on ionic currents ia and ib for each cylinder group.

The ionic current waveforms Eia and Eib thus detected are converted to ionic current pulses Gia and Gib which switch to ON level in the sections (pulse widths τ1 and τ2) above the threshold values TH1 and TH2, and shaped into the alternate pulse waveforms shown in FIG. 2.

Conversely, as shown in FIG. 3, if the threshold values TH1 and TH2 are set to the maximum value, namely, a value which is not less than the peak values ip1 and ip2 of the ionic current waveforms Eia and Eib, then neither the ionic current pulse Gia nor Gib is generated.

If the threshold values TH1 and TH2 are set to a value which is slightly smaller than the peak values ip1 and ip2 of the ionic current waveforms Eia and Eib as shown in FIG. 4, then the ionic current pulses Gia and Gib of the small pulse widths τ1 and τ2 are generated.

The ECU 2A detects the presence of the ionic current pulse Gia and Gib, the pulse widths τ1 and τ2 thereof, etc. while changing the threshold values TH1 and TH2 by a predetermined value in the range of the minimum value (see FIG. 2) to the maximum value (see FIG. 3) for each ignition control. Based on the result of the statistical processing for totalizing a plurality of detection results, the ECU 2A recognizes the generation of the ionic current i to determine the combustion state of a cylinder under ignition control.

At this time, the ECU 2A identifies the current cylinder under control according to the crank angle signal SGT, etc.; therefore, it is capable of detecting the combustion state with high reliability according to only the ionic current pulse Gia or Gib which corresponds to the current cylinder under the ignition control.

For instance, when detecting the combustion state according to the peak values ip1 and ip2, the ECU 2A changes the threshold values TH1 and TH2 from the minimum value (see FIG. 2) to the maximum value (see FIG. 3) and detects the threshold values TH1 and TH2 (see FIG. 4), which are obtained immediately before the ionic current pulses Gia and Gib are no longer detected, as the peak values ip1 and ip2.

Alternatively, the ECU 2A changes the threshold values TH1 and TH2 from the maximum value (see FIG. 3) to the minimum value (see FIG. 2) and detects the threshold values TH1 and TH2 (see FIG. 4), which are obtained when the ionic current pulses Gia and Gib are begun to be detected, as the peak values ip1 and ip2.

As shown in FIG. 4, the pulse widths τ1 and τ2 of the ionic current pulses Gia and Gib are decreased by setting the threshold values TH1 and TH2 for shaping the ionic current waveforms Eia and Eib to a high level in the vicinity of the peak values ip1 and ip2. This makes it possible to detect the peak values ip1 and ip2 of the ionic current from the threshold values TH1 and TH2 at the moment the ionic current pulses Gia and Gib are no longer detected or at the moment they are begun to be detected.

In general, the ionic current waveforms Eia and Eib change into various waveforms depending on the combustion state. When the combustion state is good and the burning velocity is high, the detection of the ionic current waveforms Eia and Eib is concentrated in a short period of time; therefore, the peak values ip1 and ip2 become high.

Hence, as illustrated in FIG. 5, when a low peak value ipe is detected, it means that a combustion failure has occurred.

Thus, the generation of the ionic currents ia and ib can be precisely detected with high accuracy so as to enable a combustion state to be determined with high reliability without adding to cost by using a plurality of two-dimensional data composed of the threshold values TH1 and TH2 which change for each ignition control and the peak values ip1 and ip2 of the ionic current waveforms Eia and Eib.

Further, the quantity of ions generated at the time of combustion can be recognized by the peak values ip1 and ip2 of the ionic current waveforms Eia and Eib. Therefore, when conducting EGR control, for example, the EGR rate can be optimized according to the quantity of generated ions.

Second Embodiment

In the foregoing first embodiment, the ionic current peak values have been detected from the presence of the ionic current pulses Gia and Gib as the varying factors for detecting the combustion state. Alternatively, however, only the presence of the ionic current pulses Gia and Gib may be detected.

Third Embodiment

In the foregoing first embodiment, the peak values ip1 and ip2 based on the presence of the ionic current pulses Gia and Gib at certain threshold values TH1 and TH2 have been detected as the varying factors. Alternatively, however, the ionic current generating period based on the pulse widths τ1 and τ2 of the ionic current pulses Gia and Gib may be detected.

In this case, the ECU 2A sets the threshold values TH1 and TH2 at the minimum value as shown in FIG. 2 and FIG.

5, and detects the ionic current generating period from the pulse widths τ1 and τ2 by approximately matching the pulse widths τ1 and τ2 of the ionic current pulses Gia and Gib to the period during which the ionic current waveforms Eia and Eib are generated.

If the combustion state of an internal-combustion engine is not good and the burning velocity is slow, then the period during which ionic current is generated is extremely extended, and a great pulse width τe corresponding to the cylinder (cylinder #1) which has incurred the combustion failure is detected as illustrated in FIG. 5.

Hence, if the ionic current generating period is extended, that is, if the burning velocity is slow, then the ECU 2A feeds back the detected result of the pulse width τe, thereby enabling optimized ignition timing to be achieved.

Thus, the generation of the ionic currents ia and ib can be precisely detected with high accuracy so as to enable a combustion state to be determined with high reliability by using a plurality of two-dimensional data composed of the threshold values TH1 and TH2 which change for each ignition control and the pulse widths τ1 and τ2 of the ionic current pulses Gia and Gib.

Further, the quantity of ions generated at the time of combustion can be recognized by the period during which the ionic current is generated; therefore, when conducting EGR control, for example, the EGR rate can be optimized according to the quantity of generated ions.

Fourth Embodiment

In the foregoing third embodiment, the period during which ionic current is generated has been detected from the pulse widths τ1 and τ2 of the ionic current pulses Gia and Gib as the varying factors for detecting the combustion state. Alternatively, however, only the pulse widths τ1 and τ2 may be detected.

Fifth Embodiment

In the first through fourth embodiments described above, the peak values ip1 and ip2 of the ionic current waveforms Eia and Eib, or the pulse widths τ1 and τ2 of the ionic current pulses Gia and Gib have been detected as the varying factors for detecting the combustion state. Alternatively, however, both the peak value of ionic current and the generating period may be detected.

In this case, the ECU 2A is allowed to presume, with high accuracy, the areas of the ionic current waveforms Eia and Eib corresponding to the quantity of generated ionic current. This makes it possible to determine a combustion state according to both peak values and generating period, permitting still higher reliability in the determination.

Sixth Embodiment

In the first through fifth embodiments described above, the peak values ip1 and ip2 of the ionic current waveforms Eia and Eib, or the pulse widths τ1 and τ2 of the ionic current pulses Gia and Gib have been detected as the varying factors for detecting the combustion state. Alternatively, however, the numbers of the ionic current pulses Gia and Gib may be detected.

Figure 6:
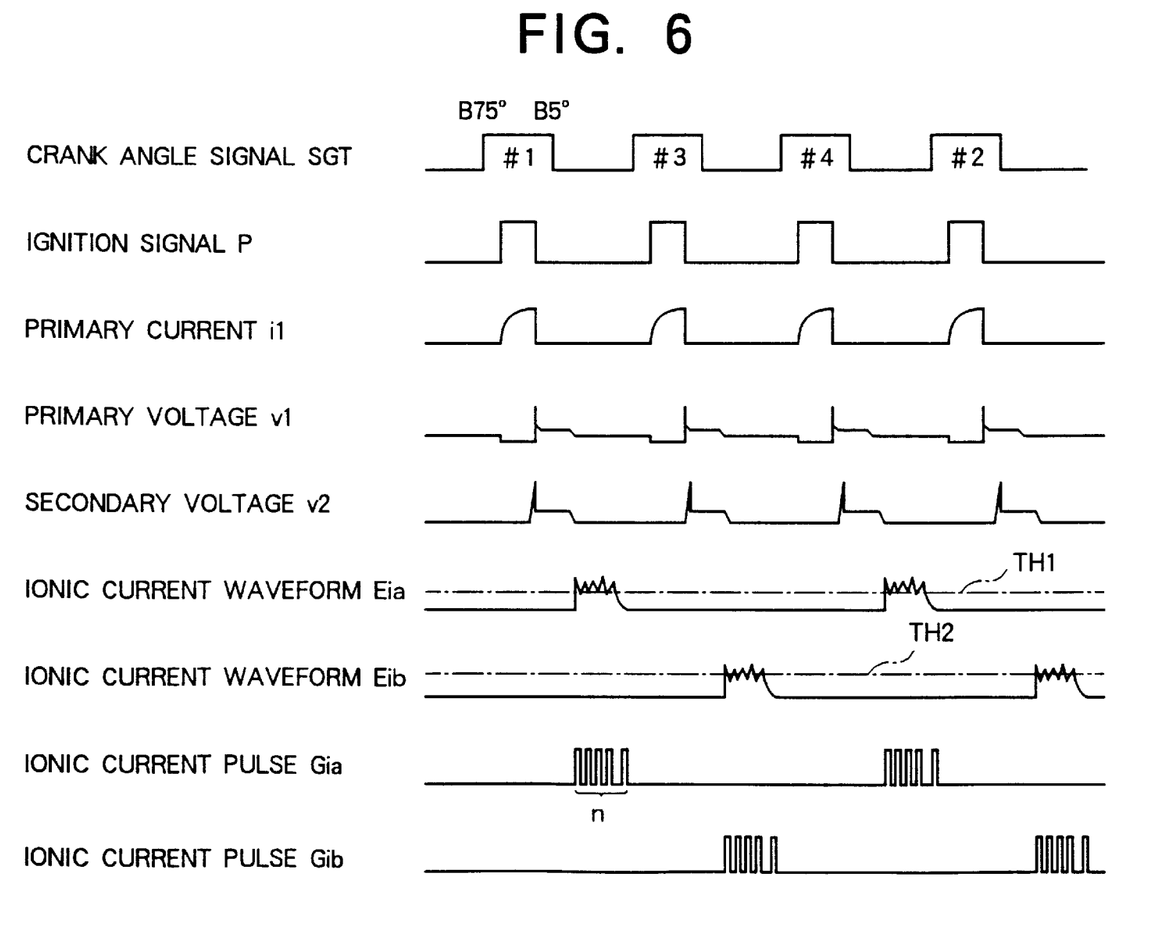
FIG. 6 shows timing charts illustrating the operation of the sixth embodiment according to the present invention.

FIG. 6 shows timing charts illustrative of the operation for detecting the number of the pulses in the sixth embodiment in accordance with the invention; it shows a case where a combustion failure has taken place. The configuration of the sixth embodiment according to the invention is as shown in FIG. 1 except that the function of the ECU 2A is partially different.

In this case, the ECU 2A changes the threshold values TH1 and TH2 to set them to the values optimized for detecting the disturbance in the ionic current waveforms Eia and Eib.

In general, if unstable stepwise combustion takes place in a cylinder under ignition control, the ionic current waveforms Eia and Eib present a plurality of peak values as shown in FIG. 6. Hence, the ECU 2A counts the number n of the ionic current pulses Gia and Gib to detect a disturbance in the ionic current waveforms Eia and Eib from the number n of pulses, thus enabling the combustion state to be determined.

Thus, a plurality of two-dimensional data composed of the threshold values TH1 and TH2 which vary for each ignition control and the number n of the ionic current pulses Gia and Gib are employed to detect a disturbance in the ionic current. Based on the detection results, the generated ionic currents ia and ib can be precisely detected with high accuracy, permitting the combustion state to be determined with high reliability.

Seventh Embodiment

In the first through sixth embodiments described above, the threshold values TH1 and TH2 of two series have been set for each cylinder group so as to improve the combustion state detecting accuracy and reliability. If, however, the variation in the ionic current of each cylinder group is negligible, then the same threshold values may be set.

Eighth Embodiment

In the first through sixth embodiments described above, the four-cylinder engine has been taken as the example, and the cylinders subjected to the detection of ionic current have been divided into the first cylinder group which includes cylinder #1 and cylinder #4 and the second cylinder group which includes cylinder #3 and cylinder #2 so as to perform the detection through the two series of ionic current detecting circuits. The number of the cylinder groups and the number of the series of the ionic current detecting circuits can be set optionally to a desired values; for example, the detection may be carried out through one series as shown in FIG. 7.

Ninth Embodiment

The foregoing first through sixth embodiments have referred to the case wherein the high voltage is distributed to the respective spark plugs 8a through 8d via the distributor 7 from the secondary winding 4b of the ignition coil 4; however, there is no restriction on the distributing method, and the invention may be applied also to a case wherein low voltage is distributed.

What is claimed is:

1. A combustion state detecting apparatus for an internal-combustion engine, comprising:

a crank angle sensor which issues, in synchronization with the revolution of the internal-combustion engine, a crank angle signal having a pulse edge which corresponds to a reference crank angle position;

a plurality of cylinders which are subjected to ignition control in synchronization with the revolution of the internal-combustion engine;

an ignition coil for applying high voltage for ignition to spark plugs of respective cylinders;

an ionic current detecting circuit which detects an ionic current flowing via a spark plug, which has just been subjected to ignition control, by applying bias voltage to at least one spark plug;

a comparison device which compares a detected ionic current signal with a first threshold value and outputs a first ionic current pulse signal; and an electronic control unit (ECU) which drives the ignition coil according to the crank angle signal and determines a combustion state of the internal-combustion engine according to the first ionic current pulse signal;

wherein the ECU changes the first threshold value by a predetermined value for each ignition control and determines the combustion state according to each change in the first threshold value and according to whether the first ionic current pulse signal is generated for each change in the first threshold value.

2. A combustion state detecting apparatus for an internal-combustion engine according to claim 1, wherein:

the ionic current detecting circuit comprises:

a first ionic current detecting circuit for detecting each ionic current corresponding to a first cylinder group among the plurality of cylinders, and a second ionic current detecting circuit for detecting each ionic current corresponding to a second cylinder group among the plurality of cylinders;

and wherein the comparison device comprises a first comparator circuit connected to the first ionic current detecting circuit and receiving the first threshold value and a second comparator circuit connected to the second ionic current detecting circuit and receiving a second threshold value; and wherein the ECU changes the first and second threshold values individually supplied to the first comparator circuit and the second comparator circuit.

3. A combustion state detecting apparatus for an internal-combustion engine according to claim 1, wherein the ECU determines the combustion state according to the first threshold value and the presence of the first ionic current pulse signal.

4. A combustion state detecting apparatus for an internal-combustion engine according to claim 3, wherein the ECU increases the first threshold value by a predetermined value from a minimum value for each ignition control and detects the a first final threshold value, at which the first ionic current pulse signal is no longer generated, as the peak value of the ionic current in order to judge the combustion state according to the peak value.

5. A combustion state detecting apparatus for an internal-combustion engine according to claim 3, wherein the ECU decreases the first threshold value by a predetermined value from a maximum value for each ignition control and detects the threshold value, at which the first ionic current pulse signal begins to be generated, as the peak value of ionic current in order to judge the combustion state according to the peak value.

6. A combustion state detecting apparatus for an internal-combustion engine according to claim 1, wherein the ECU judges the combustion state according to the first threshold values and the pulse width of the first ionic current pulse signal.

7. A combustion state detecting apparatus for an internal-combustion engine according to claim 6, wherein the ECU detects the pulse width, which is obtained when the first threshold value is set to the minimum value, as the generating period of the ionic current, and determines the combustion state according to the generating period of the ionic current.

8. A combustion state detecting apparatus for an internal-combustion engine according to claim 1, wherein the ECU:

detects a peak value of the ionic current according to the first threshold value and the presence of the first ionic current pulse signal;

detects the generating period of the ionic current according to the first threshold value and the pulse width of the first ionic current pulse signal; and determines the combustion state according to the peak value and the generating period.

9. A combustion state detecting apparatus for an internal-combustion engine according to claim 1, wherein the ECU determines the combustion state according to the first threshold value and the number of pulses in the first ionic current pulse signal.

* * * * *

UNITED STATES PATENT AND TRADEMARK OFFICE
CERTIFICATE OF CORRRECTION

PATENT NO. : 5,861,551
DATED : January 19, 1999
INVENTOR(S) : Shingo Morita, et al.

It is certified that error appears in the above-identified patent and that said Letters Patent is hereby corrected as shown below:

On the title page, item [56], insert the following:

U. S. PATENT DOCUMENTS

| EXAMINER INITIAL | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|
| | 5 | 2 | 2 | 2 | 3 | 9 | 3 | 29 June 1993 | Ohsawa | | | |
| | 5 | 2 | 3 | 0 | 2 | 4 | 0 | 27 July 1993 | Ohsawa | | | |
| | | | | | | | | | | | | |

FOREIGN PATENT OR PUBLISHED FOREIGN PATENT APPLICATION

| | | DOCUMENT NUMBER | | | | | | | PUBLICATION DATE | COUNTRY OR PATENT OFFICE | CLASS | SUBCLASS | TRANSLATION | |
|---|---|---|---|---|---|---|---|---|---|---|---|---|---|---|
| | | | | | | | | | | | | | YES | NO |
| | DE | 4 | 1 | 1 | 6 | 2 | 7 2 | A 1 | 17 May 91 | DE | | | | |
| | DE | 4 | 1 | 2 | 0 | 9 | 3 5 | A 1 | 25 June 91 | DE | | | | |
| | DE | 4 | 2 | 0 | 4 | 4 | 8 4 | A 1 | 14 Feb. 92 | DE | | | | |
| | | | | | | | | | | | | | | |

Signed and Sealed this

Twenty-sixth Day of October, 1999

*Attest:*

Q. TODD DICKINSON

*Attesting Officer*     *Acting Commissioner of Patents and Trademarks*